Aug. 5, 1969   J. A. EILERS   3,459,459

TRACK DRIVING SYSTEM

Filed June 16, 1967   3 Sheets-Sheet 1

JOHN A. EILERS
INVENTOR.

BY *H. M. Saragovitz*
*E. J. Kelly, H. Berl*
and *R. M. Lyon*

ATTORNEYS

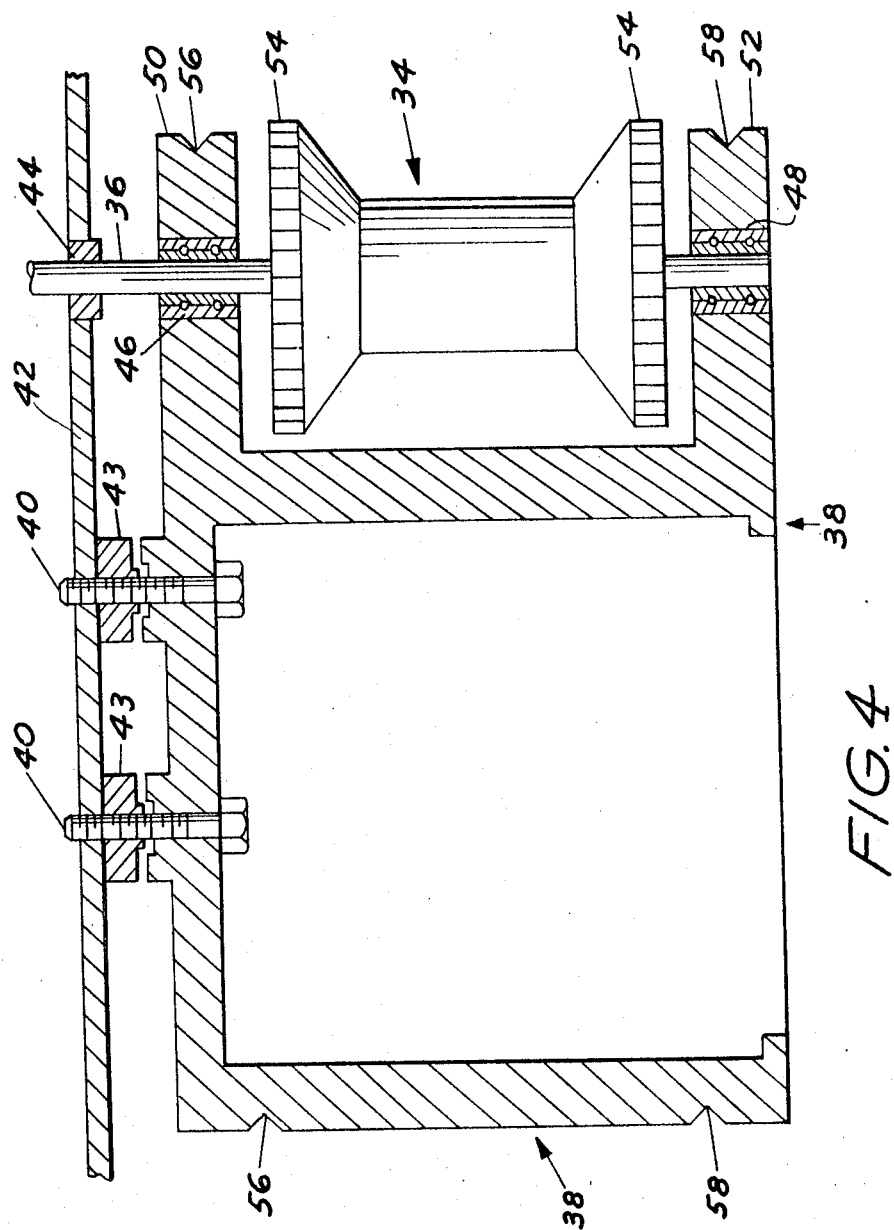

Aug. 5, 1969 J. A. EILERS 3,459,459
TRACK DRIVING SYSTEM
Filed June 16, 1967 3 Sheets-Sheet 3
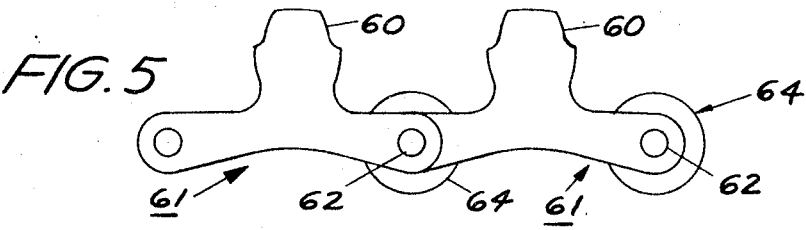
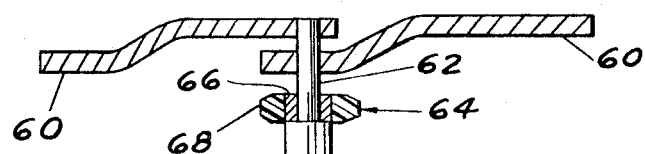
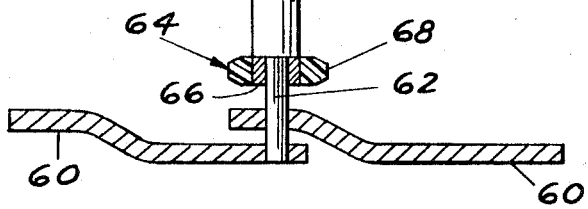
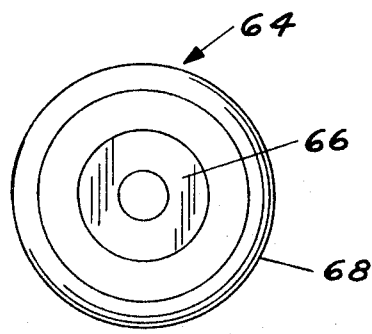
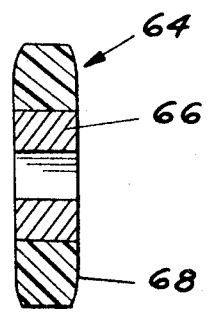
JOHN A. EILERS
INVENTOR.
BY H. M. Saragovitz
E. J. Kelly, H. Berl
and R. M. Lyon
ATTORNEYS United States Patent Office 3,459,459
Patented Aug. 5, 1969

3,459,459
TRACK DRIVING SYSTEM
John A. Eilers, 27746 Park Court,
Madison Heights, Mich. 48071
Filed June 16, 1967, Ser. No. 647,300
Int. Cl. B62d *55/00, 55/08;* F16h *7/00*
U.S. Cl. 305—33                    5 Claims

ABSTRACT OF THE DISCLOSURE

The dynamic transition which generates vibrations in the free lengths of track or chain in endless track or chain driving systems is eliminated through the use of a modified driving system which utilizes a curve having zero curvature at its points of contact with the endless track or chain in the linear portions of its path of motion to produce smooth transition in such systems. According to the preferred embodiment the curve consists of a hypocycloid.

---

The invention described herein may be manufactured and used by or for the Government for governmental purposes without the payment to me of any royalty thereon or therefor.

Current endless track and chain driving systems are driven by a circular sprocket wheel while the path of the track or chain entering and leaving the area of the sprocket wheel is linear. Because of this mismatch of curvature, a dynamic transition occurs at the points of initial and final engagement between the track or chain and the sprocket wheel. Such a transition generates vibrations in the free lengths of track proceeding away from the point of disengagement of the track with the driving sprocket wheel. At the point where the track or chain leaves the sprocket wheel, there is a large accelerating force out of line with the path of motion, which induces a severe vertical vibration in the length of track or chain proceeding away from that point.

Since this length of track or chain is generally unsupported and may weight several thousand pounds in large vehicles or machines, the vibration caused as set out above is generally the most violent in the entire apparatus. This vibration may, in the case of a vehicle, limit the maximum vehicle speed, and in all types of apparati raise the noise level, reduce the life of the driving members and of the track or chain, and dissipate a large percentage of the horsepower delivered to the driving system in useless motion.

It is therefore an object of the present invention to eliminate the above described vibration.

It is another object of the present invention to provide a chain or track driving system which eliminates the above described vibration.

Other objects and advantages of the present invention will be made obvious to those skilled in the art by the following description when considered in relation to the accompaning drawings of which:

FIGURE 4 is an elevated cross sectional view of the carrier portion of the preferred embodiment of the endless track or chain driving system of the present invention;

FIGURE 5 is a side view of two links of the drive chain portion of the preferred embodiment of the endless track or chain driving system of the present invention;

FIGURE 6 is an elevated cross sectional view of the drive chain portion of the preferred embodiment of the endless track or chain driving system of the present invention;

FIGURE 7 is a plan view of a roller of the drive chain portion of the preferred embodiment of the endless track or chain driving system of the present invention; and FIGURE 8 is a cross-sectional view of a roller of the drive chain portion of the preferred embodiment of the endless track or chain driving system of the present invention.

According to the present invention, there is provided an endless track or chain driving system comprising a sprocket wheel mounted upon a transmission output shaft, an endless track or chain, and means for transmitting the output of said transmission output shaft to said endless track or chain, said transmission means generating a curve having zero curvature at points of contact with said endless track or chain in linear portions of the path of motion of said endless track or chain, thus providing smooth dynamic transition at the point of maximum applied driving force. More particularly, the invention provides an endless track or chain driving system which by generating a hypocycloidal path for the endless track or chain at the driving means, eliminates out of line accelerating forces caused by mismatch of curvature occurring at points of engagement and disengagement between the endless track and the commonly utilized circular sprocket wheel driving means.

Still more particularly, the invention provides an endless track or chain driving system comprising a sprocket wheel driven by a transmission output shaft, a carrier which is hypocycloidally shaped, supporting said sprocket wheel and providing a guide for a drive chain which is driven by said sprocket wheel, said drive chain having sprocket shaped extensions of the lateral portions of its shaped links which engage sockets in the endless track or chain and drive it through a hypocycloidal curve thus eliminating accelerating forces out of line with the path of motion of the track at points of initial and final engagement between the drive chain and the endless track.

Figure 1:
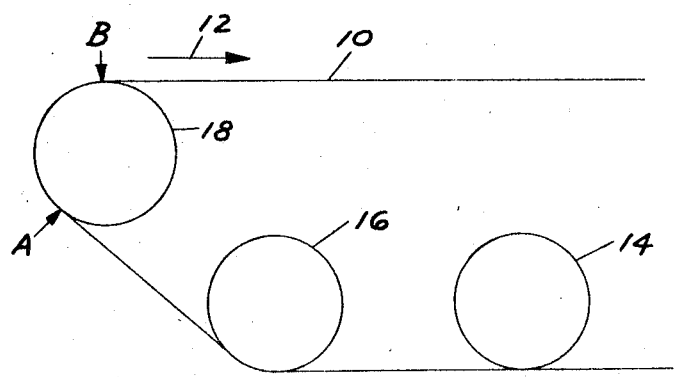
FIGURE 1 is a schematic representation of the sprocket and endless track or chain systems of the prior art.

Referring to the drawings wherein like numerals refer to like parts, there is presented in FIGURE 1 a schematic representation of the sprocket wheel driving means of endless track or chain systems of the prior art. The endless track or chain 10 moves in the direction indicated by arrow 12. The endless track or chain passes under ground wheels 14 and 16 and thence upward to and over sprocket wheel 18. As the track or chain passes through the area between ground wheel 16 and sprocket 18, its path is linear. Similarly, upon disengagement with the sprocket at point B, the endless track or chain again assumes a linear path of motion. However, between points A and B, which represent points of engagement and disengagement of the endless track or chain with the sprocket wheel respectively, the path followed by the track is circular. Because of this mismatch of curvature at points A and B, there occurs a dynamic transition which generates vibrations in the free lengths of track proceeding away from B.

Figure 2:
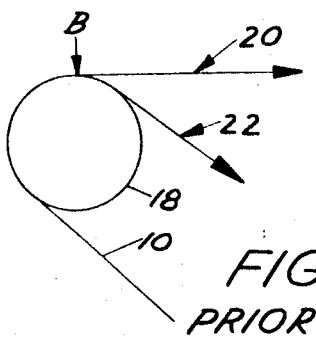
FIGURE 2 is a force diagram showing some of the transitional forces exerted on the endless track or chain members of the prior art systems.

The cause of the vibration is demonstrated graphically in FIGURE 2 which presents a force diagram showing the forces exerted upon the endless track as it comes off of sprocket wheel 18 at point B. The two forces are represented as vector 20, which represents the driving force imparted by sprocket wheel 18, and vector 22 which represents the accelerating force imparted to the endless track by the mismatched curvature at point B. The latter force, is that which induces severe vertical vibration in the length of track proceeding away from B.

The source of the above-described vibration can be eliminated by producing a smooth transition at B. This is accomplished, according to the present invention, by forcing the track, between points A and B, to follow a path of motion which has substantially zero curvature at its end points. Such a curve is provided by the hypocycloid which can be generated in the systems where required.

The following description of the invention will be made with reference to the use of the invention upon endless track vehicles, and it should be understood that such use is solely for purposes of disclosure and in no way limits the essence or applicability of the invention.

It should be further understood that the following description of a system generating a hypocycloid is intended merely for purposes of demonstrating a preferred embodiment of the invention, and that many alternative means, some of which are mentioned at the close of the description, may be substituted therefor without departing from the nature and spirit of the invention.

Figure 3:
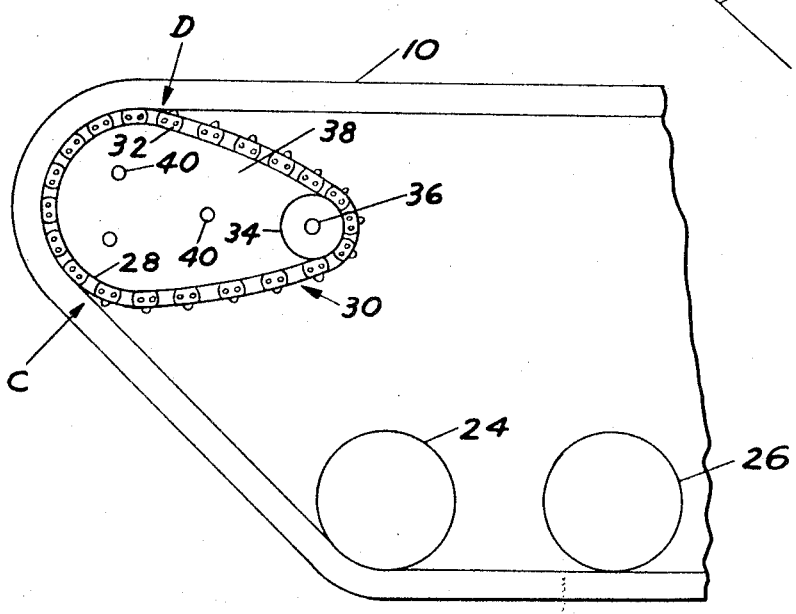
FIGURE 3 is a plan view of the preferred embodiment of the track driving system of the present invention.

As shown in FIGURE 3, the endless track 23 passes under ground wheels 24 and 26 and follows ground contour while passing thereunder. The track upon leaving ground wheel 24 follows a linear path, the track pitch line, until it meets the first contacting link 28, the point of engagement being hereinafter referred to as point C, of drive chain 30. At this point, the drive chain links which are shaped like sprocket teeth and are described in detail below engage the endless track and constrain the track to follow a hypocycloidal path so that all accelerations and forces are aligned with the path of motion as the track again enters a linear path as it disengages drive chain 30 at link 32, the point of disengagement being hereinafter referred to as point D.

In the driving system of this invention, the drive chain 30 is driven by a sprocket wheel 34 mounted directly upon the transmission output shaft 36, thereby replacing that function of a final drive gear set whereby the output of the transmission is transferred to the sprocket shaft.

The drive chain is guided in the hypocycloidal path desired by a restraining guide or carrier 38 which is bolted to the body of the track driven vehicle. The mounting for the carrier as described below should provide a shock mount and be reinforced for proper load distribution.

As shown in FIGURE 4, the carrier 38 is bolted by means of bolts 40 which may be of any suitable number and size to the vehicle hull 42. The shock mount in the embodiment depicted consists of an elastomeric nut-like structure 43 which acts as a shock absorber between vehicle hull 42 and carrier 38 and prevents the application of excessive direct pressure upon the hull.

The transmission output shaft 36 passes through the vehicle hull 42 and is supported therein by bearing 44. The shaft is supported in the carrier by roller bearings 46 and 48 which are mounted in the output shaft carrier support arms 50 and 52 and permit free rotation of the shaft in position. Mounted upon the transmission output shaft between output shaft support arms 50 and 52 of the carrier is sprocket wheel 34 which actually drives the drive chain member of the system of this invention by engaging the sprockets 54 of sprocket wheel 34 with the chain links as occurs in any common sprocket and chain system.

The carrier further comprises a set of peripheral grooves 56 and 58 which serve to guide the roller portions 60 of the drive chain 30 shown in detail in FIGURES 7 and 8, and hence to guide the drive chain 30 in its path about the carrier member.

The transmission output shaft transmits a rotating energy to the sprocket wheel which in turn engages the drive chain and drives it through a hypocycloidal path established by the carrier periphery. The drive chain is guided around the hypocycloidal path by the grooves 56 and 58 which engage rollers as part of the drive chain.

The drive chain itself is shown in a side view in FIGURE 5 and in an elevated cross-sectional view in FIGURE 6. The lateral portions of the links are shaped like sprockets with an extended portion 60 of each link 61 serving to engage the endless track in the conventional manner. The links are held together by pins 62 which form a press fit with the outermost links and further serve to carry rollers 64 which are shown in detail in FIGURES 7 and 8. The pins 62 are also the portions of the drive chain which are engaged by sprockets 54 of sprocket wheel 34. The roller 64 comprises, according to a preferred embodiment, a journal bearing 66 surrounded by a molded polymer composition rim 68.

Since the size of the hypocycloid generated may be increased according to the size of the apparatus under consideration or the demands of a particular application, the transmission output shaft may be oriented in any reasonable and convenient manner and from its location a suitable hypocycloid generated to produce the desired driving apparatus. Such a variable transmission output shaft orientation allows for the utilization of a variety of engine and transmission types and sizes in the same basic vehicle.

Thus, as the drive chain is guided by the carrier through its hypocycloidal path, the sprocket-like links engage the endless track and drive it through the same hypocycloidal path eliminating the mismatch of curvature which occurred in prior art systems and caused the vibrations described above.

The invention disclosed herein with regard to endless track vehicles may of course have similar application in endless chain driven apparati or machinery wherein the generation of similar vibrations is a problem.

Although the invention has been disclosed utilizing the hypocycloid as the preferred embodiment of a curve having zero curvature at its points of contact with the endless track or chain in the linear portions of its path of motion, it should be understood that any number of similar curves which have at least one inflection point may be utilized to achieve a similar result. Among such curves are the lituus and the semi-cubical parabola. The hypocycloid is utilized simply because it is the simplest of the qualifying curves to generate in the type of machinery under consideration.

Since it is obvious that many changes and modifications can be made in the above-described details without departing from the nature and spirit of this invention, it is to be understood that this invention is not limited to said details except as set forth in the appended claims.

What is claimed is:

1. An endless track or chain driving system of the character described wherein maximum driving force is applied to said endless track or chain by a member which simultaneously alters the direction of the path of travel thereof, said system comprising a sprocket wheel mounted upon a transmission output shaft, an endless track or chain, and means interposed on the inner side of said track including a flexible drive element for transmitting the output of said transmission output shaft to said endless track or chain, said transmitting means which alters the direction of travel of said endless track generating a constant and predetermined curve having zero curvature at points of initial and final contact with said endless track or chain spaced within linear portions of the path of travel thereof and providing smooth dynamic transition between the linear and curved portions of said path of travel at the point of travel at the point of maximum applied driving force.

2. An endless track or chain driving system in accordance with claim 1 wherein said curve having zero curvature at points of contact with said endless track or chain in linear portions of the path of motion of said endless track or chain consists of a hypocycloid.

3. An endless track or chain driving system in accordance with claim 2 wherein said transmission means comprises a sprocket wheel mounted upon said transmission output shaft, a drive chain, means for said drive chain to engage said endless track or chain, said drive chain being driven by said sprocket wheel, and a hypocycloidal carrier supporting said sprocket wheel and providing means for guiding said drive chain.

4. An endless track or chain driving system in accordance with claim 3 wherein said drive-chain to endless track or chain engagement means comprises sprocket shaped extensions of the lateral portions of the links of said drive-chain which engage sockets in said endless track or chain.

5. An endless track or chain driving system as set forth in claim 4 wherein said guiding means comprises at least one groove extending about the periphery of said hypocycloidal carrier, said peripheral groove engaging rollers which form portions of each link of said drive chain.

References Cited

UNITED STATES PATENTS

| | | | |
|---|---|---|---|
| 905,405 | 12/1908 | Britton | 305—47 |
| 1,847,152 | 3/1932 | Webb. | |
| 2,741,133 | 4/1956 | Barski | 74—221 X |
| 2,747,420 | 5/1956 | Beck | 74—219 |
| 3,205,022 | 9/1965 | Eckert | 305—57 X |

FOREIGN PATENTS

| | | |
|---|---|---|
| 510,341 | 9/1920 | France. |

RICHARD J. JOHNSON, Primary Examiner

U.S. Cl. X.R.

74—219; 305—57